US010963401B2

(12) United States Patent
Zehnder et al.

(10) Patent No.: US 10,963,401 B2
(45) Date of Patent: Mar. 30, 2021

(54) CONTROL ARRANGEMENT FOR A COFFEE MACHINE

(71) Applicant: RANCILIO GROUP S.P.A., Villastanza di Parabiago (IT)

(72) Inventors: Markus Zehnder, Villastanza di Parabiago (IT); Benedict Ammann, Villastanza di Parabiago (IT); Nuria Poblet Casanovas, Villastanza di Parabiago (IT)

(73) Assignee: RANCILIO GROUP S.P.A., Villastanz Adi (IT)

( * ) Notice: Subject to any disclaimer, the term of this patent is extended or adjusted under 35 U.S.C. 154(b) by 0 days.

(21) Appl. No.: 16/629,998

(22) PCT Filed: Jul. 10, 2018

(86) PCT No.: PCT/IB2018/055077
§ 371 (c)(1),
(2) Date: Jan. 10, 2020

(87) PCT Pub. No.: WO2019/012422
PCT Pub. Date: Jan. 17, 2019

(65) Prior Publication Data
US 2020/0133890 A1    Apr. 30, 2020

(30) Foreign Application Priority Data

Jul. 13, 2017    (IT) .................. 102017000078886

(51) Int. Cl.
*G06F 13/00* (2006.01)
*G06F 13/10* (2006.01)
(Continued)

(52) U.S. Cl.
CPC .............. *G06F 13/10* (2013.01); *A47J 31/52* (2013.01); *G06F 13/4282* (2013.01); *G06F 2213/0016* (2013.01)

(58) Field of Classification Search
None
See application file for complete search history.

(56) References Cited

U.S. PATENT DOCUMENTS 7,780,081 B1 * 8/2010 Liang ................. G06Q 30/0633
235/383
2003/0085621 A1    5/2003 Potega
(Continued)

OTHER PUBLICATIONS

Springbok Digitronics, "1-Wire Design Guide v1.0", Aug. 2004.
Maxim Integrated, "DS2433 4Kb 1-Wire EEPROM", Oct. 2010.

*Primary Examiner* — Henry Tsai
*Assistant Examiner* — Dean Phan
(74) *Attorney, Agent, or Firm* — Howson & Howson LLP

(57) ABSTRACT

A control arrangement for a coffee machine is provided and comprises a central unit having a main control unit and a plurality of peripheral units/components. Each peripheral unit/component is connected to the central unit by means of a "smart" connector, which is coded and which can provide information relating to the unit/component connected thereto to the main control unit. In order to allow information to be transferred, the central unit comprises a master communication device, each peripheral unit/component is provided with a slave communication device, and a communication line is provided for connecting the master communication device to the slave communication devices. The transferred information is unambiguously associated to the unit/component and may comprise counters, historical information, performance data and the like.

11 Claims, 4 Drawing Sheets

(51) Int. Cl.
*A47J 31/52* (2006.01)
*G06F 13/42* (2006.01)

(56) References Cited

U.S. PATENT DOCUMENTS

| | | |
|---|---|---|
| 2004/0093902 A1 | 5/2004 | Lachmann |
| 2008/0116262 A1 | 5/2008 | Majer |
| 2009/0234403 A1* | 9/2009 | Liu .................... A61N 1/3925 607/5 |
| 2012/0239840 A1 | 9/2012 | Pimputkar et al. |
| 2015/0039788 A1* | 2/2015 | Dearing ................. G06F 13/20 710/18 |
| 2016/0310134 A1* | 10/2016 | Contini .............. A61B 17/0686 |

* cited by examiner

CONTROL ARRANGEMENT FOR A COFFEE MACHINE

TECHNICAL FIELD

The present invention relates to a control arrangement for a coffee machine.

More particularly, though not exclusively, the present invention relates to a control arrangement for a so-called fully automatic coffee machine.

BACKGROUND ART

Coffee machines having a wide variety of different structures and operating principles are known.

In particular, so-called fully automatic coffee machines are known, in which, upon selection of a desired coffee drink by a user (e.g. by pushing a button), all the operations necessary for the preparation and delivery of a coffee drink are carried out automatically.

To this purpose, in general fully automatic coffee machines comprise several functional units, which may include a grinding unit for grinding coffee beans into coffee powder, a weighing unit for selecting the correct dose of coffee powder, a brewing unit for brewing coffee starting from the coffee powder dose, a foaming unit for foaming milk, a fridge unit for keeping milk at low temperature, and so on.

Fully automatic coffee machines also comprise a control unit for controlling the above-mentioned functional units according to the user's selection.

The control unit sends command signals to the functional units containing the instructions to be carried out, and receives from such functional units signals containing information relating to their operating conditions. Usually, the control unit also has a memory module for storing historical information relating to the coffee machine operation (operating conditions, number of working cycles, history of faults and so on).

Also other kinds of coffee machines, such as for instance so-called semi-automatic coffee machines, may comprise a similar control arrangement, which includes a main control unit and a plurality of peripheral, functional units communicating with each other.

This kind of control arrangements, however, has several limitations and drawbacks.

First of all, known control arrangements for coffee machines are able to carry out a general control of the coffee machine, i.e. the control is carried out at the level of the functional units, but they are not capable of implementing a detailed control of the coffee machine, i.e. a control of each single component (e.g. motors, pumps, valves) of the coffee machine.

As the functional units of a coffee machine may have a complex structure, maintenance and servicing operation exclusively based upon such general information can be ineffective and time-consuming.

Secondly, known control arrangements are not able to identify whether or not the prescribed functional unit (e.g. an original functional unit approved by the coffee machine manufacturer) has been mounted to the coffee machine, thus avoiding use of not allowed spare parts.

Thirdly, in known control arrangements all information is stored solely in the main control unit, so that a peripheral unit, once removed from the coffee machine, contains no historical information concerning its operation.

EP 1 626 375 discloses an apparatus and method for controlling a dispensing machine comprising a plurality of modules or sub-assemblies in which at least one of said modules or sub-assemblies is provided with an electronic tag and the machine is provided with a tag scanner or reader for interacting with said tag by reading, writing and transmitting information data on or through said tag and operating said dispensing machine according to the information gathered from said tag(s). Such tag(s) may contain an identification code as well as information regarding the operating parameters of the associated module/sub-assembly. Although dealing with some of the above-mentioned problems, the control arrangement disclosed in EP 1 626 375 has a complex structure and entails the need of a dedicated component, i.e. the tag scanner or reader, for implementing the communication between the central control unit and the modules or sub-assemblies of the dispensing machine. The provision of such tag scanner or reader makes the central control unit of the dispensing machine more complicated and the communication between said central control unit and the modules or sub-assemblies less reliable.

EP 2 254 280 discloses a domestic appliance comprising a plurality of operational components, in which each of said components is provided with a combined control/connector and all the combined control-connectors are electrically coupled to a same bus. The disclosed domestic appliance further comprises a central control unit, which is not electrically coupled to the bus.

EP 2 254 280 is completely silent with respect to the above-mentioned problems.

The main object of the present invention is therefore to overcome the aforesaid drawbacks and limitations by providing an improved control arrangement for coffee machines.

More specifically, an object of the present invention is to provide a control arrangement allowing to exchange information with single components of the functional units of the coffee machine, such as motors, pumps, valves and the like, in a simple a reliable way, avoiding the need of additional components.

Another object of the present invention is to provide a control arrangement in which the historical information relating to a component operation is associated not only to the coffee machine, but also to the component itself.

A further object of the present invention is to provide a control arrangement capable of identifying whether the correct, prescribed components are mounted to the coffee machine.

These and other objects are achieved by a control arrangement for a coffee machine as claimed in the appended claims.

DISCLOSURE OF INVENTION

The control arrangement for a coffee machine according to the invention comprises a central unit provided with a main control unit and a plurality of peripheral units/components, wherein each peripheral unit/component is connected to the central unit by means of a "smart" connector, which is coded and which can provide information relating to the unit/component connected thereto to the main control unit.

Thanks to the fact that the "smart" connector is coded, only the correct, required peripheral unit/component can be associated to such "smart" connector. For instance, only a unit/component prescribed by the coffee machine manufacturer can be associated to the "smart" connector.

Thanks to the fact that the "smart" connector can provide information relating to the peripheral unit/component connected thereto, useful information can be transmitted to the main control unit of the coffee machine.

Such information is unambiguously associated to the unit/component and may comprise counters (e.g. working hours, number of activations), historical information (e.g. manufacturing data, revision data), performance and calibration data and the like.

Such information can be exploited and/or displayed by the coffee machine central unit, for instance for servicing and maintenance purposes.

More particularly, the control arrangement according to the invention allows a bi-directional exchange of information between the central unit of the coffee machine and the peripheral units/components of said coffee machine.

In order to allow such exchange of information, said central unit comprises a main control unit provided with a master communication device connected thereto and each peripheral unit/component is provided with a slave communication device, a communication line being provided between said master communication device and each of said slave communication devices.

The slave communication device comprises at least a storage module, in which information concerning the peripheral/unit component can be stored and updated.

According to a preferred embodiment of the invention, the communication line is a bus protocol.

According to a particularly preferred embodiment of the invention, such bus is a 1-wire® bus protocol.

In the context of the present invention, peripheral units may include functional units of the coffee machine, such as a grinding unit, a weighing unit, a brewing unit, a milk foaming unit, and the like; peripheral components include single components of said functional units, such as motors, pumps, valves, and the like.

BRIEF DESCRIPTION OF DRAWINGS

Additional features and advantage will be more evident from the detailed description of some preferred embodiments of the invention, given by way of non-limiting example with reference to the attached drawings, in which.

MODE(S) FOR CARRYING OUT THE INVENTION

Figure 1:
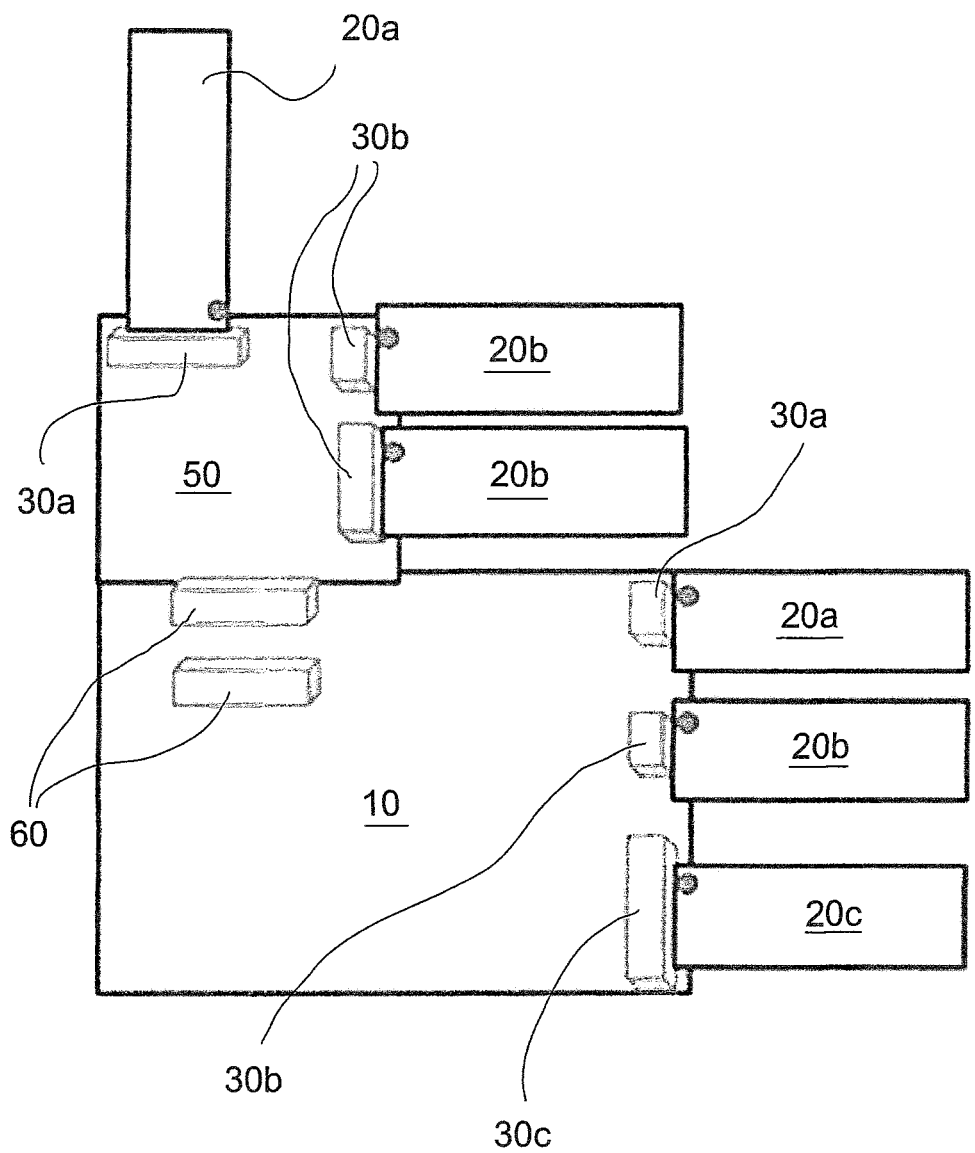
FIG. 1 is a block diagram schematically showing the control arrangement for a coffee machine according to the invention.

In FIG. 1 a general block diagram schematically depicting the control arrangement 1 for a coffee machine according to the invention is shown.

The control arrangement 1 substantially comprises a central unit 10 and a plurality of peripheral equipments that may include both peripheral units (such as a grinding unit, a weighing unit, a brewing unit, a milk foaming unit, and the like) and single peripheral components (such as motors, pumps valves) of the aforesaid functional units.

According to the invention, the central unit 10 is connected to each peripheral unit/component 20a, 20b, 20c by means of respective "smart" connectors 30a, 30b, 30c, to which said peripheral units/components 20, 20b, 20c are connected by means of their own connectors or plugs (not shown).

Each "smart" connector 30a, 30b, 30c is coded so that it is able to identify the peripheral unit/component that is being connected thereto.

Moreover, each "smart" connector 30a, 30b, 30c can provide information relating to the peripheral unit/component 20a, 20b, 20c connected thereto to the central unit 10.

To this purpose, each peripheral unit/component 20a, 20b, 20c is provided at least with a storage module in which the information is stored.

Such information may include counters (e.g. working hours, number of activations), historical information (e.g. manufacturing data, revision data), performance and calibration data and the like.

At the end of manufacturing process at the factory, each peripheral unit/component 20a, 20b, 20c already contains some information, which may include a manufacturer code, an identification code identifying the type and model of unit/component, manufacturing data (e.g. manufacturing date) and calibration data.

Once a peripheral unit/component 20a, 20b, 20c is connected to the coffee machine through a respective "smart" connector 30a, 30b, 30c, the central unit 10 of the coffee machine is able to read and check the aforesaid information.

Moreover, during operation of the coffee machine, the central unit is preferably able to update such information, for instance by adding performance data and fault history data.

Peripheral components 20b of different kinds (e.g. a pump or a valve) can be connected to the same "smart" connector 30b, as such connector 30b is able to identify what kind of component is connected thereto and to exchange adequate information according to the specific kind of component (e.g. both a valve and a pump could be connected to the central unit through a same "smart" connector 30b; however the information exchanged with the peripheral component connected to said "smart connector" will be different depending on whether the peripheral component is a valve or a pump).

More specifically, said "smart" connector 30b is capable of detecting whether the peripheral component is a sensor or an actuator and to exchange corresponding, adequate information therewith.

By way of example, a table is reported here below in which different kinds of units/components are indicated as being able to be connected to the same "smart" connector.

TABLE 0001

Table 1

| Smart connector on central unit 10 | Kind of plug on peripheral unit/component | Connected unit/component |
|---|---|---|
| 30a | "A" | Motor 20a |
| 30a | "A" | Valve 20a |
| 30b | "B" | Pump 20b |

TABLE 0001-continued

Table 1

| Smart connector on central unit 10 | Kind of plug on peripheral unit/component | Connected unit/component |
|---|---|---|
| 30b | "B" | Valve 20b |
| 30b | "B" | Motor 20b |
| 30b | "B" | Grinding unit 20b |
| 30c | "C" | Motor 20c |
| 30c | "C" | Milk pump 20c |
| 30c | "C" | Fridge 20c |
| 30c | "C" | Brewing unit 20c |

As shown in the table, both a motor 20a and a valve 20a can be connected to a same "smart" connector 30a through their own plugs (i.e. both the motor 20a and the valve 20a are provided with a plug "A" that is compatible with the "smart" connector 30a). However, the information exchanged with the peripheral component connected to said "smart connector" 30a will be different depending on whether the peripheral component is a motor or a valve 20a.

Analogously, both single components, such as a pump, valve or motor 20b, and a functional unit, such as a grinding unit 20b, can be connected to a same "smart" connector 30b through their own plugs (type "B" plugs). In this case, too, the information exchanged with the peripheral unit/component connected to said "smart connector" 30b will be different depending on the type of the peripheral unit/component 20b.

The same applies to "smart" connector 30c and peripheral units/ components 30c.

It is therefore evident that the "smart" connectors of the control arrangement 1 according to the invention allow a bi-directional information exchange between the central unit 10 and the peripheral units/components 20a, 20b, 20c: on one hand, the central unit sends signals to said peripheral units/components; on the other hand, the central unit also gets information from said peripheral units/components. Moreover, the central unit updates the information stored in said peripheral units/components.

Still with reference to FIG. 1, the control arrangement 1 may further comprise an external module 50, which is connected to the central unit 10 by means of suitable connectors 60. The external module 50 may carry further "smart" connectors 30a, 30b, so that further peripheral units/components 20a, 20b can be connected to said external module through said further "smart" connectors 30a, 30b.

In this case, too, peripheral units/components of different kinds can be connected to the same further "smart" connector, as such further "smart" connector is able to identify what kind of unit/component is connected thereto and to exchange adequate information according to the specific kind of unit/component.

Figure 2:
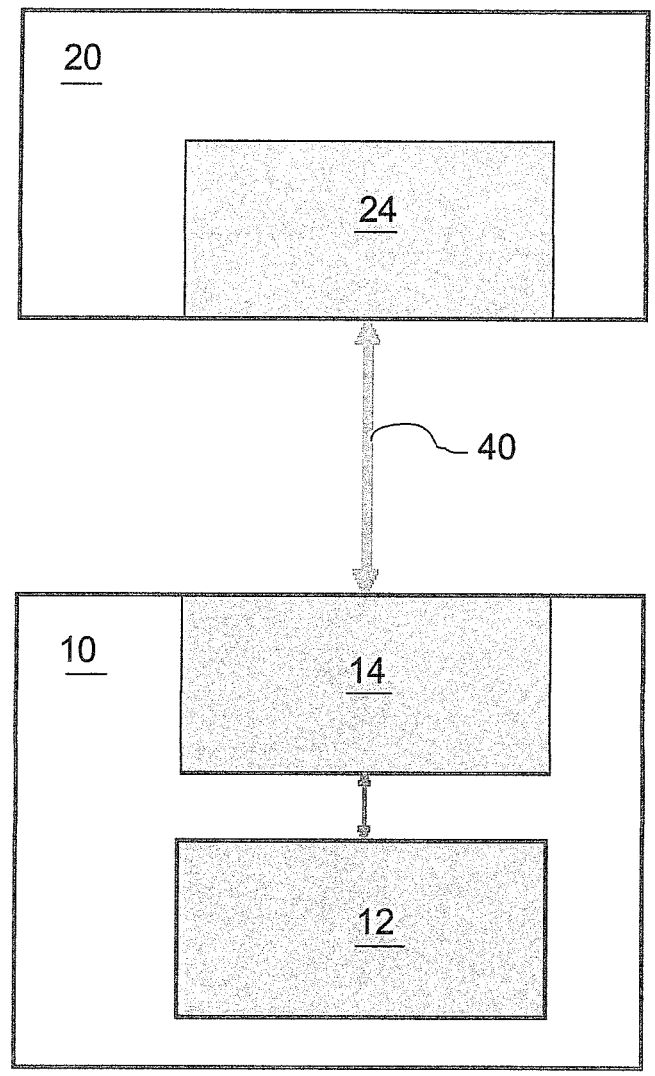
FIG. 2 is a block diagram schematically showing the communication system between the central unit and a peripheral unit/component of a coffee machine according to a first preferred embodiment of the control arrangement according to the invention.

With reference to FIG. 2, the aforesaid information is transferred from each generic peripheral unit/component 20 to the central unit 10 through a communication line, which—according to a preferred embodiment of the invention—is implemented as a bus protocol 40.

Therefore, the central unit 10 comprises a main control unit 12 and a master communication device 14, connected to said main control unit 12 and further connected to the bus protocol 40.

On the other hand, each peripheral unit/component 20 is provided with a slave communication device 24 connected to the bus protocol 40, which slave communication device comprises at least a storage module storing the information relating to said peripheral unit/component 20.

The connection between the central unit and each peripheral unit/component 20 can comprise a communication line for information transmission and a separate power line for power transmission. However, it is also possible to provide for a single connecting cable for both information transmission and power transmission.

Figure 3:
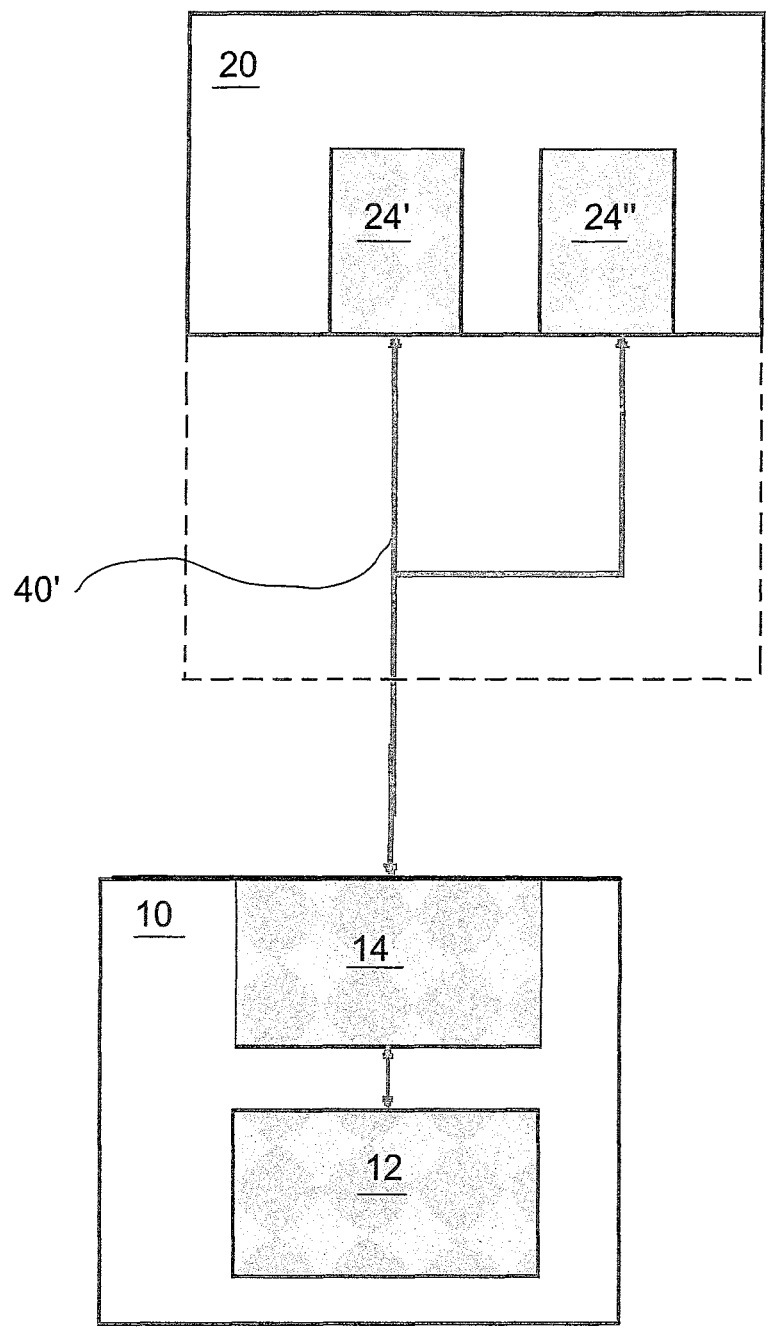
FIG. 3 is a block diagram schematically showing the communication system between the central unit and a peripheral unit/component of a coffee machine according to a second preferred embodiment of the control arrangement according to the invention.

With reference to FIG. 3, according to a particularly preferred embodiment of the invention, the communication line between the central unit 10 and each generic peripheral unit/component 20 is implemented as a 1-wire® bus protocol 40'.

As in the previously disclosed embodiment, the central unit 10 comprises a main control unit 12 and a master communication device 14, connected to said main control unit 12 and further connected to the 1-wire® bus protocol 40', while on the other hand each peripheral unit/component 20 is provided with at least one slave communication device connected to the 1-wire® bus protocol 40' and including at least a storage module 24'.

In the shown embodiment, such storage module of the slave communication device is implemented as a 1-wire® integrated circuit (IC).

1-wire® ICs have no intelligence, they are just a memory for storing information. The information will be written to the 1-wire® IC 24' by a control board. The main control unit 12 of the central unit 10 of the coffee machine will be able to read the information from the 1-wire® IC 24' through the 1-wire® bus protocol 40' and to send new, updated information to said 1-wire® IC (still through the 1-wire® bus protocol 40'), that will be stored therein.

As mentioned above, the information contained in the 1-wire® IC 24' may include counters (e.g. working hours, number of activations), historical information (e.g. manufacturing data, revision data), performance and calibration data and the like.

Therefore, the 1-wire® IC 24' will communicate with the main control unit 12, while no direct communication will occur between the peripheral unit/component 20 and its 1-wire® IC 24'. A 1-wire® IC 24' will be physically attached to the corresponding peripheral unit/component 20, so that the information in the 1-wire® IC 24' is unambiguously associated to said peripheral unit/component 20.

The central unit 10 will preferably be provided with a display unit (not shown) for showing—e.g. to a technician carrying out servicing or maintenance routines—the aforesaid information.

It is evident that the arrangement of the invention allows to significantly reduce the complexity of configuration and maintenance of the coffee machine: information unambiguously associated to single components (motors, pumps, valves) of the various functional units of the coffee machine can be directly checked and displayed on the display unit of the coffee machine, thus allowing a technician to easily and quickly carry out configuration and maintenance operations.

The slave communication device of the peripheral unit/component may optionally comprise a further module, namely a control module 24", through which the main control unit 12 of the central unit 10 of the coffee machine can control the operation of the peripheral unit/component 20. The control module 24" is also connected to the 1-wire® bus protocol 40' for communication with the main control unit 12 of the central unit 10.

The 1-wire® bus protocol 40' may be optionally integrated in the peripheral unit/component 20, as shown in broken line in FIG. 3.

The information exchanged between the peripheral unit/component 20 and the central unit 10 through the 1-wire® bus protocol 40' may comprise a plurality of common data (i.e. general data, common to all units/components) and a plurality of specific data (i.e. technical data which are specific for a given kind of unit or component).

Common data may include, for instance, a 1-wire® serial number (i.e. a unique identification code), an indication of the family type of the unit/component, manufacturing data, manufacturer codes, counters (such as worked hours, number of operating cycles), and so on.

Specific data may include, for instance, calibration data and fault history.

As mentioned above, before being mounted to the coffee machine, the 1-wire® IC 24' will already contain information related to the manufacturing thereof, such as manufacturer serial number and calibration data.

Once mounted to the coffee machine, the central unit 10 of said coffee machine will be able to read and check the information contained in said 1-wire® IC 24'.

Then, the central unit 10 of said coffee machine will be able to modify the information contained in said 1-wire® IC 24', for instance by incrementing counters and by updating performance data and fault history.

Figure 4:
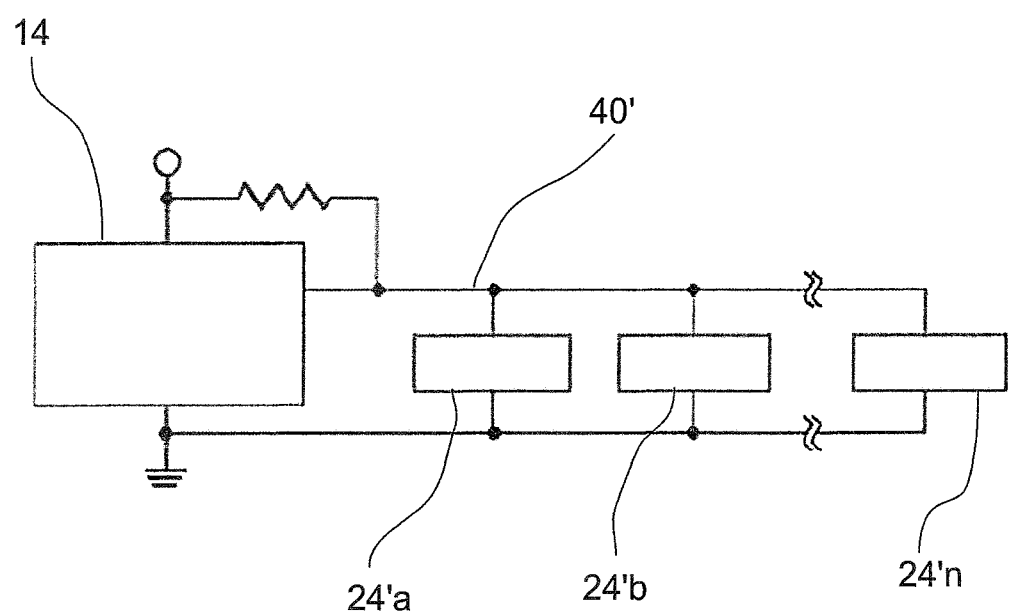
FIG. 4 is a block diagram schematically showing the communication system between the central unit and the plurality of peripheral units/components of a coffee machine according to the second preferred embodiment of FIG. 3.

In FIG. 4, the overall arrangement of the communication system between the central unit and the peripheral units/components of the coffee machine is schematically shown.

The master communication device 14 of the central unit 10 is connected through the 1-wire® bus protocol 40' to the slave communication devices 24'*a*, 24'*b*, 24'*n* (i.e. the 1-wire® ICs 24'*a*, 24'*b*, 24'*n*) of all the peripheral units/components.

The central unit 10 is able to list and identify the different peripheral units/components thanks to the unique 1-wire® serial number (identification code); all the other information will be linked to said unique 1-wire® serial number—and therefore unambiguously associated to the peripheral unit/component—and updated accordingly.

It is evident from the above that the control arrangement according to the invention achieves the objects set forth above, as it allows controlling the coffee machine at a deeper level (single components of each unit) and provides a bi-directional exchange between the central unit and the peripheral units/components of information unambiguously associated to each peripheral unit/component.

The above-disclosed embodiments have been given by way of non-limiting examples and several variants and modification are possible without departing from the scope of protection as defined by the appended claims.

The invention claimed is:

1. A control system for a coffee machine, comprising:
a central unit provided with a main control unit; and
a plurality of peripheral equipment, said peripheral equipment including peripheral units and single peripheral components of the peripheral units;
wherein the central unit is provided with one or more connectors, to which the peripheral units and the single peripheral components are connected by means of their connectors or plugs;
wherein the connectors of the central unit are coded and are configured to provide information relating to the peripheral units and the single peripheral components connected thereto to the central unit, each of the connectors of the central unit being configured to identify either of the peripheral unit or the single peripheral component that is connected to the connector and to select either of the provided information relating to the connected peripheral unit or the single peripheral component according to the specific kind of peripheral unit or the single peripheral component;
wherein the peripheral units and the single peripheral components are provided with a storage module storing the information, and the connectors of the central unit are configured to provide providing information stored in the storage module and relating to the peripheral units and the single peripheral components to the central unit;
wherein the central unit is configured to update the information contained in the storage module of the peripheral units and the single peripheral components;
wherein the central unit comprises a master communication device, connected to the main control unit and further connected to a communication line and each peripheral unit and the single peripheral component is provided with a slave communication device connected to the communication line;
wherein the slave communication device comprises at least the storage module storing the information relating to the peripheral unit or the single peripheral component; and
wherein the communication line is a 1-wire® bus protocol.

2. The control system according to claim 1, wherein a single connecting cable is used both as the communication line for information transmission between the master communication device and each of the slave communication devices and as power line for power transmission between the central unit and each of the peripheral units and the single peripheral components.

3. The control system according to claim 1, wherein said 1-wire® bus protocol is integrated in the peripheral units and the single peripheral components.

4. The control system according to claim 1, wherein the slave communication device is implemented as a 1-wire® integrated circuit.

5. The control system according to claim 4, wherein the 1-wire® integrated circuit is configured to communicate with the main control unit, while no direct communication occurs between each of the peripheral units and the single peripheral components and its 1-wire® integrated circuit.

6. The control system according to claim 4, wherein the 1-wire® integrated circuit is physically attached to the corresponding peripheral unit or the single peripheral component.

7. The control system according to claim 4, wherein the slave communication device of the peripheral unit or the single peripheral component further comprises a control module, which is also connected to the 1-wire® bus protocol.

8. The control system according to claim 1, further comprising an external module, which is connected to the central unit and carries further connectors for connecting further peripheral units and the single peripheral components, the further connectors being coded and being configured to provide information relating to the peripheral units and the single peripheral components connected thereto to the central unit.

9. The control system according to claim 1, wherein the peripheral units include one or more units selected from the group consisting of a grinding unit, a weighing unit, a brewing unit, a foaming unit and a fridge unit.

10. The control system according to claim 1, wherein the single peripheral components include motors, pumps and valves of said peripheral units.

11. The control system according to claim 1, wherein the information includes an identification code of the peripheral unit or the single peripheral component and further includes counters, manufacturing data, calibration data, performance data and/or and fault data of the peripheral unit or the single peripheral component.

* * * * *